June 18, 1968     E. SCHÄFER     3,388,605

STEPPING DEVICE FOR DIRECTLY DRIVEN OSCILLATORY SYSTEM

Filed Feb. 8, 1966

United States Patent Office 3,388,605
Patented June 18, 1968

3,388,605
STEPPING DEVICE FOR DIRECTLY DRIVEN OSCILLATORY SYSTEM
Eberhard Schäfer, Bad Durrheim, Germany, assignor to Kienzle Uhrenfabriken G.m.b.H., Schwenningen am Neckar, Germany, a limited-liability company of Germany
Continuation-in-part of application Ser. No. 350,858, Mar. 10, 1964. This application Feb. 8, 1966, Ser. No. 525,907
5 Claims. (Cl. 74—88)

ABSTRACT OF THE DISCLOSURE

The invention is a stepping device for converting oscillatory motion of a staff or spindle to unidirectional motion of a toothed wheel which may, in turn, be used to drive a clockwork. Cams on the spindle have trailing edges offset in the axial direction from a partial circumferential safety flank so that normally the cams will push a tooth clear of the surface of the safety flank against the tooth during the major part of half a cycle of the spindle. Excessive reverse moments on the toothed wheel, however, do force a tooth back against the safety flank to stop the wheel.

---

Figure 1:
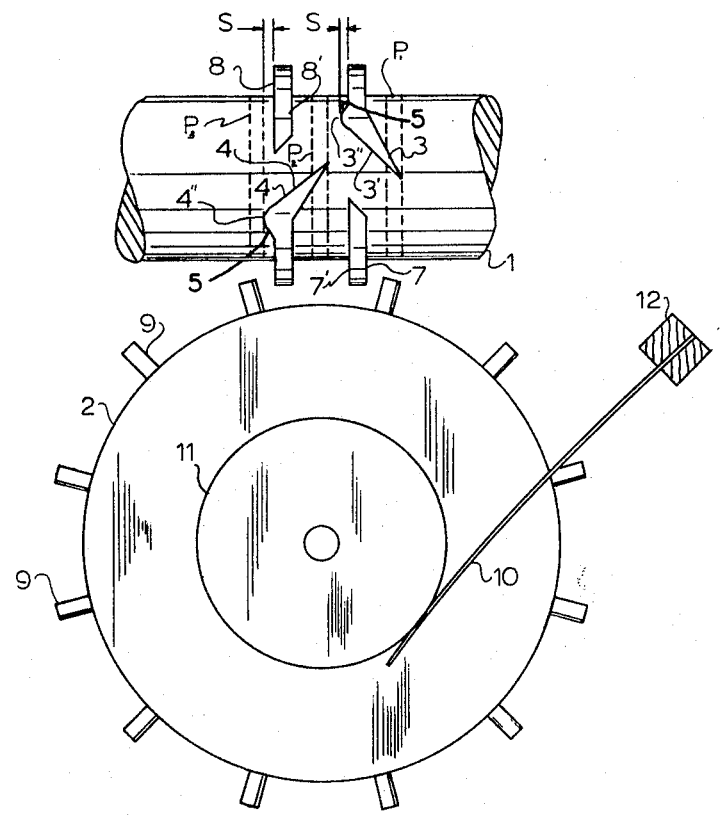

This is a continuation-in-part of my co-pending application, Ser. No. 350,858, filed Mar. 10, 1964, now abandoned.

This invention relates to a stepping device for the drive of a work train by a directly driven oscillatory system comprising a balance wheel and a spiral hair spring.

Stepping devices of this nature as were hitherto known did not function well. In German Patent No. 563,566 there is disclosed a device in which two drive lugs, blades or files are mounted on a balance staff and cooperate with teeth of a stepping wheel. At each half swing of the balance the stepping wheel is carried half the distance between two teeth. The disadvantage of the sort of construction shown there is the failure of a suitable safety or insurance to prevent the stepping wheel from making a complete revolution if the stepping wheel and drive flies are out of engagement. This situation arises either when the hands are not balanced out or when the hands are being set manually. Then too, with that construction the edges of the flies clash on the edges of the stepping wheel teeth so that the time piece remains stopped.

Some of these disadvantages have been reduced by means of a device shown in Swiss Patent No. 133,248, wherein at the stepping flies or cams there are adjacent annular safety flanks which prevent the stepping wheel from making a complete revolution if the hands are not balanced or if they are being set. But in that construction there arises the disadvantage that during the entire oscillation of the balance the stepping wheel teeth and the safety flanks rub against each other. There is therefore a continuing frictional moment or drag on the balance and this affects the isochronic characteristics and causes erratic dissipation of energy. This operational drag on the balance can be minimized by means of a braking spring urged against the stepping wheel. The reaction moment from the spring brake minimizes the net moments of the pointer-works friction reaction transmitted back to the stepping wheel. Nonetheless there is a powerful suppression of the balance wheel, especially if the applied moment of the stepping wheel from the hands and the gear train acts counter to the direction of motion of the running time piece, since the safety flanks and the wheel teeth engage each other constantly.

The present invention reduces these defects. The working surfaces of the respective cams do not join directly on the surfaces of the annular safety flanks, but there is provided a free or non-working surface between the cam and the safety flank.

This substantial discontinuity of the working surface of the cam and that of its associated safety flank is such that the working surfaces force the teeth of the stepping wheel a little in advance of the surface of the safety flanks.

Figure 2:
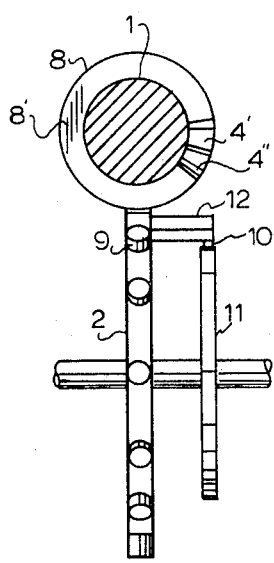
Figure 3:
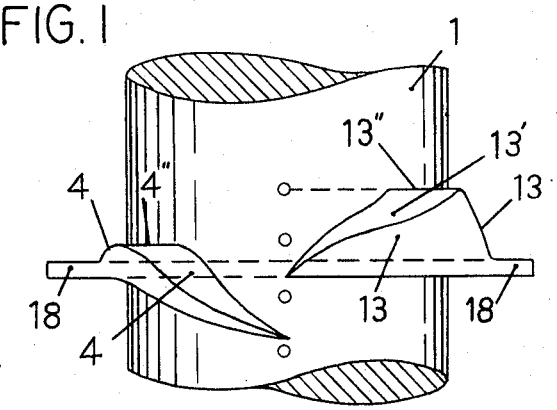

In the drawing:

FIG. 1 shows elementally the stepping device from a side while FIG. 2 shows the same in end view, and FIG. 3 shows a modification of the device.

The stepping device is provided on an oscillatory balance staff 1 carrying a balance wheel and hair spring (not shown) and cooperates with a stepping wheel 2. In a time piece the wheel 2 drives a gear train to turn hands. The stepping device comprises a pair of circumferentially spaced radial pallets or cams 3 and 4 having oppositely sloped 45° working surfaces 3' and 4' respectively to cam one of the teeth 9 of the stepping wheel to turn the latter unidirectionally.

On a forward swing of the balance, such as with the cam 3 moving downwardly, the right tooth 9 is cammed to the left to move the tooth approximately a half step from a position at $P_1$ to $P_2$. During the reverse swing the tooth is cammed from $P_2$ to $P_3$ by the cam 4 to complete the step.

Annular flange-like safety flanks 7 and 8 merge with the flies 3 and 4 respectively to the rear of their working surfaces and present planar stopping surfaces 7' and 8' against which a tooth may bear when an appreciable counter moment is applied to the stepping wheel. The stopping surfaces 7' and 8' are each offset from the trailing edges 3" and 4", shown rounded, of the cams in axial direction by a distance S so as to leave free or non-working surfaces 5 where the flanks and cams merge. Thus the cams push the teeth past the planes of the flanks and there is no rubbing of flanks on the teeth during normal oscillation of the balance.

Of course the flanks 7 and 8 terminate short of a complete circular closure with their respective cams so that teeth may pass during nullage of the balance, but this necessary gap may be quite small and decrease to zero degrees overall by beveling the ends of the flanks.

A spring blade brake 10 to bear on a drum 11 on the stepping wheel and fixed at an end 12 provides a substantially constant reaction torque to prevent any back lash from allowing the teeth and safety flanks from rubbing during normal operation, and maintains the wheel in stationary position between actual stepping movements.

The stepping wheel becomes advanced half a step every time the balance passes through nullage. It is advantageous to make the stepping wheel parts, as well as those parts on the balance staff 1, out of plastic to really minimize noise.

The brake frictional moment is preferably greater than the frictional moment due to setting of the hands of the associated gear train when the device is used in a time piece.

The width of the saftey flanks is small compared with that of the cams and so there is no normal chance for the cam 3 to push a tooth against the safety flank 8 of the other cam.

While the above described stepping device is satisfactory, it may be reduced in cost by providing only one safety flank 18 of generally annular shape and embracing the shaft 1 as does the flank 8 in FIG. 2. The safety flank 18 carries at one end the same cam 4 of FIG. 1 with camming surface 4'. At the other end of the flank 18 the cam 13 has a camming surface 13' which displaces the teeth of the stepping wheel essentially the same distance as does the surface 4', but when the spindle 1 turns in the opposite direction. The trailing edge 13" of cam 13 is even further remote from the safety flank 18, in fact by a tooth-spacing. The general mode of operation by the device of FIG. 3 is similar to that shown in FIG. 1. Tests show that there is essentially the same reliability of operation and furthermore the number of surfaces requiring precise finishes is reduced. Moreover, the angular positions of the cams with respect to each other about the shaft or spindle is more easily assured.

The invention claimed is:

1. A stepping device for driving works of a time piece comprising an oscillatory balance staff adapted to be driven by an external source of power, a pair of cams projecting substantially radially from the staff and provided respectively with camming surfaces inclined in opposite directions along the staff, each surface having a trailing edge, a stepping wheel lying in a plane substantially including the axis of the staff and provided with uniformly spaced radial teeth to project into the paths of the cams, the camming surfaces of each cam being of sufficient length in the axial direction of the staff to move the wheel approximately half the distance between the teeth multiplied by a whole number including 1, at least one generally annular safety flank on and about the staff merging with the cams and presenting substantially parallel planar stepping surfaces to which the staff axis is perpendicular and at least one of said safety flanks having one of said stepping surfaces axially inner from the trailing edge of any cam with which it merges so that the respective camming surfaces when engaging a tooth push the latter as far as the trailing edge and move the tooth past the stopping surfaces to prevent rubbing of the teeth on a stopping surface during normal oscillation of the staff, and spring braking means for retarding movement of the wheel to prevent the teeth from moving backward against the safety flank.

2. A device as claimed in claim 1 and for a time-piece having a frictionally coupled hand-gearing, the reaction movement of the braking means being at least as great as that transmitted from hand-gearing.

3. A device as claimed in claim 1, the teeth of the stepping wheel and the cams being of plastic to reduce noise during operation.

4. A device as claimed in claim 2, there being only one safety flank, and said one of said stopping surfaces merging with the two cams.

5. A device as claimed in claim 2 said at least one annular safety flank being two in number and each flank having said one of said stopping surfaces inner of the trailing edge merging respectively with only one cam.

References Cited
UNITED STATES PATENTS 2,654,214   10/1953   Steiger _____ 58—116
2,979,629   4/1961    Smulski _____ 74—88

FRED C. MATTERN, JR., *Primary Examiner.*

W. S. RATLIFF, *Assistant Examiner.*